(12) United States Patent
Uchiyama et al.

(10) Patent No.: US 6,565,261 B1
(45) Date of Patent: May 20, 2003

(54) OPTICAL FIBER CONNECTOR

(75) Inventors: Takeshi Uchiyama, Chiba (JP); Tomohiro Shimada, Chiba (JP); Masahiro Nakajima, Chiba (JP); Shinichi Iwano, Tokyo (JP); Shin Sumida, Tokyo (JP)

(73) Assignees: Seiko Instruments Inc. (JP); Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/510,037

(22) Filed: Feb. 22, 2000

(30) Foreign Application Priority Data

Feb. 22, 1999 (JP) .......................................... 11-043811

(51) Int. Cl.$^7$ ................................................ G02B 6/38
(52) U.S. Cl. ............................ 385/60; 385/58; 385/139
(58) Field of Search ........................... 385/53, 55, 56, 385/58, 60, 69, 70, 72, 76, 77, 78, 139

(56) References Cited

U.S. PATENT DOCUMENTS

| 4,699,462 A | | 10/1987 | Jones ...................... 350/96.23 |
|---|---|---|---|
| 4,984,865 A | * | 1/1991 | Lee et al. .................... 156/322 |
| 5,142,601 A | * | 8/1992 | Shibata et al. ................. 385/60 |
| 5,363,459 A | * | 11/1994 | Hultermans .................. 385/53 |
| 5,418,874 A | * | 5/1995 | Carlisle et al. ............. 385/139 |
| 5,436,995 A | * | 7/1995 | Yoshizawa et al. ......... 385/136 |
| 6,196,730 B1 | * | 3/2001 | Hammar ..................... 385/139 |
| 2001/0033730 A1 | * | 10/2001 | Fentress ...................... 385/139 |

FOREIGN PATENT DOCUMENTS

JP          10186180          7/1998

\* cited by examiner

Primary Examiner—Rodney Boverniek
Assistant Examiner—Sung Pak
(74) Attorney, Agent, or Firm—Adams & Wilks

(57) ABSTRACT

An optical fiber connector has a stop ring having an end portion having an outer periphery and an optical fiber cable having a strength member extending from an end thereof. An adhesive material is disposed over the end portions of the stop ring and the optical fiber cable so that at least a portion of the strength member of the optical fiber cable is embedded in the adhesive material. A heat-shrinkable tube has an inner surface and is disposed on the adhesive material so that the portion of the strength member is disposed between the inner surface of the heat-shrinkable tube and the outer periphery of the stop ring.

12 Claims, 14 Drawing Sheets

F I G. 5
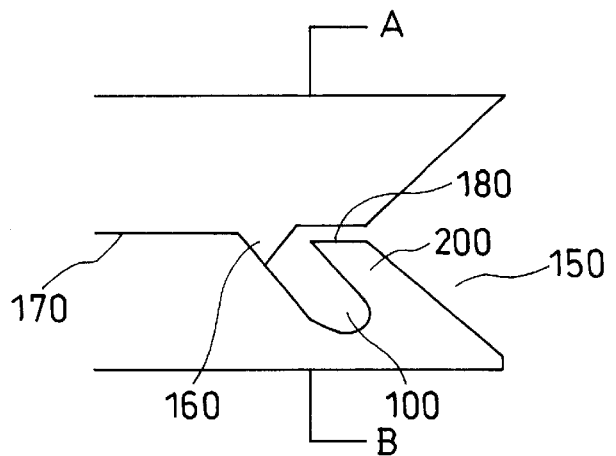
F I G. 6
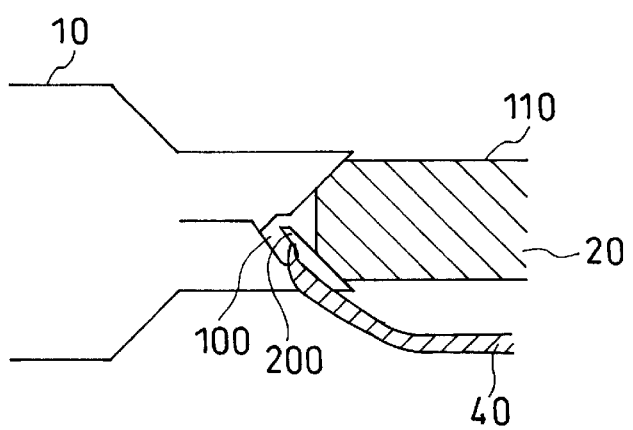
F I G. 7
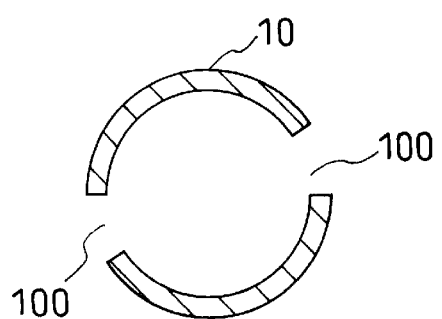

Fig. 22
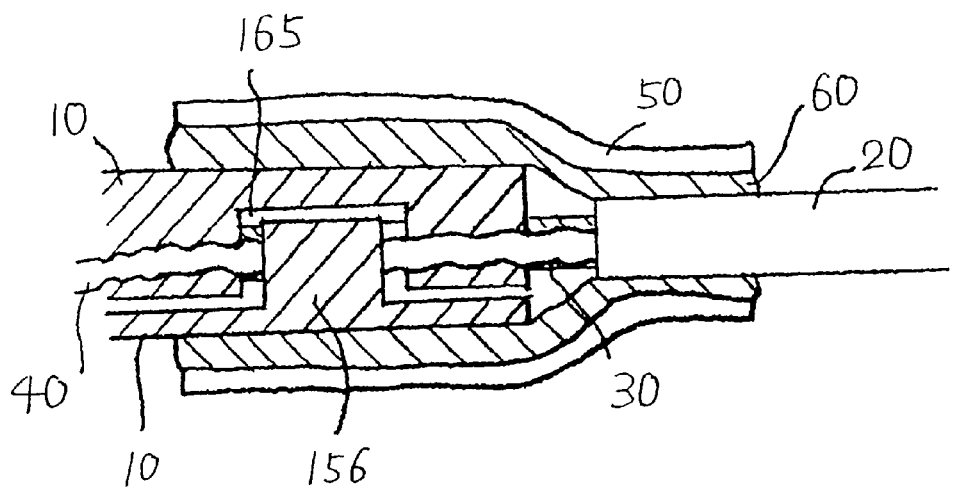
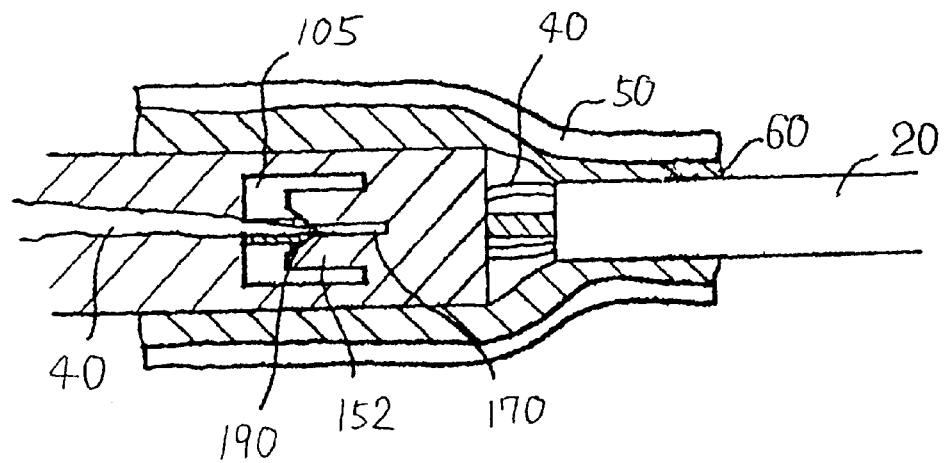
Fig. 23

OPTICAL FIBER CONNECTOR

BACKGROUND OF THE INVENTION

This invention relates to a stop ring used for an optical connector that located between optical fiber transmission lines in order for transmission line switching or cutting off, parts used for fixing an optical fiber cord.

In the conventional optical connector, an optical fiber cord is fixed by caulking compression and friction with a strength member sandwiched between an outer periphery of an opposite end of a stop ring holding a ferrule through a compression spring to a side connecting the ferrule and a ring-formed caulking ring A. Furthermore, an outer jacket of the optical fiber cord is also fixed by crimping from a rear of the caulking ring A by another caulking ring A. Refer to Japanese Industrial standard JIS 5973.

As another method, as shown in FIG. 3 there has been a method of fixing with a heat-shrinkable tube 50 after arranging the strength member 40 at an outer periphery of a stop ring 10 after inserting a buffer coating 30 on a side of the stop ring 10 fixing a cord 20.

Because the conventional optical connector requires a caulking tool and further two metal-make caulking rings, there has been a problem that two caulking processes are required complicating the processes and raising fabrication cost. Furthermore, the caulking ring is required to have even pressure and friction to the optical fiber cord. There has been a problem of high forming accuracy requirement and increase in parts fabrication cost.

Also, in the method of using a heat-shrinkable tube, there has been a problem that the optical fiber cord is easily removed because the heat-shrinkable tube is low in compression fixing strength.

Further in recent year, the optical connector needs down sizing and a diameter of the optical fiber cord becomes smaller. Then the number of strength member is decrease and there has been a problem that the connecting strength by caulking ring is decrease. Furthermore because of small-diameter cord, a radius of curvature during folding the strength member becomes small and the strength member tends to break.

SUMMARY OF THE INVENTION

The present invention has an adhesive and heat-shrinkable tube on an optical fiber cord fixing side of the stop ring, i.e., on an outer periphery of an opposite end connecting a spring urging a ferrule, and a surface of an outer sheath of an optical fiber cord at an end connecting the stop ring, and is arranged with a strength member in the adhesive at between an outer periphery of the stop ring and the heat-shrinkable tube. By thus using both the adhesive and the heat-shrinkable tube, a plurality of caulking rings are unnecessary that are a cause of process increase, enabling the reduction in the number of parts and manufacture cost.

Also, in the present invention, by using the heat-shrinkable tube with adhesive that an adhesive is previously applied to an inner surface of the heat-shrinkable tube, it is possible to collectively fix the strength member and the outer sheath to the stop ring through once heating.

Furthermore, in the present invention, a cut-out on the optical fiber cord fixing end side of the stop ring and a through-hole coupled to the cut-out in an outer peripheral surface nearby the end surface are provided, and the strength member is passed through the through-hole. Furthermore, the strength member passing the through-hole is bent to an opposite side of the end of the stop ring. The heat-shrinkable tube is arranged in a manner covering the fixing end of the optical fiber cord of the stop ring and the outer jacket of the optical cord having at a surface the bent strength member. By heating, the stop ring and the optical fiber cord are fixed.

With the above structure, the optical fiber cord can be firmly fixed with respect to a tensile direction due to a tensile strength of the strength member. Furthermore, by the adhesive, it is possible to prevent against removal of the strength member and increase the air-tightness between the heat-shrinkable tube and optical cord outer sheath. It is possible to prevent moisture from entering to an inside of the connector. It is possible to obtain a connector excellent in environmental reliability.

Also, in the present invention, the stop ring further comprising a claw which project in the direction of the radius of the stop ring. Then the claw limits a movement of heat-shrinkable tube in the axis direction and the claw prevent the tube from coming out. As a consequent, the fixing strength of an optical connector by strength member is increased.

BRIEF DESCRIPTION OF THE DRAWINGS

FIG. 5 is a view showing a stop ring of the present invention,

FIG. 6 is a view showing an embodiment of an optical connector of the present invention, FIG. 7 is a sectional view showing a stop ring of the present invention, FIG. 22 is a sectional view of a optical connector of the present invention, and FIG. 23 is a sectional view of a optical connector of the present invention.

DESCRIPTION OF THE PREFERRED EMBODIMENTS

In the optical connector of the present invention, a heat-shrinkable tube with adhesive is used for fixing a stop ring and optical cord. A Strength member is fixed on an outer periphery of the stop ring by an adhesive and the heat-shrinkable tube on the adhesive. The heat-shrinkable tube uses a thermoplastic plastic. Furthermore, preferred are an electron beam crosslinking polyolefine resin, irradiated crosslinking polyolefine, irradiated crosslinking polyolefine, irradiated crosslinking vinylidene, irradiated crosslinking elastomer, fluoride elastomer, polyvinyl chloride, crosslinking polyethylene, polyethylene terephthalate, silicone rubber. Also, the adhesive is preferably a hot melt type adhesive or thermally fusible uncrosslinked polyorefine. In addition, it is possible to use a thermosetting adhesive.

The optical connector structured as above uses a heat-shrinkable tube with adhesive. Accordingly, it is possible to obtain an optical connector having resin softness, excellent in waterproof due to the adhesive, and light weighted and high in tensile strength.

The stop ring is made of elastic metal such as stainless steel for example Japanese Industrial Standard SUS 304, brass, phosphor bronze and high elastic plastic material. The shapes of the stop ring are not only a ring but also the sectional structures of square, triangle and polygon can be used.

The claw can be placed in the rear of the stop ring, more specifically in an end of the stop ring which is opposite to an end of the stop ring fixing a spring connecting and pressing a ferrule. Also the claw is a pair or two pairs of claws that are parallel to the axis direction of the stop ring and symmetrical about the center of the stop ring axis. Further the claw direct to the radius direction of the stop ring and the claw can be placed a pair opposite to the axis direction of the stop ring. Another method is that the claw can be connected to a body of the stop ring through the intermediate of a joint. Further it is preferable to aim the direction of the top of the claw to the spring side. Also the claw can be arranged parallel to the radius direction of the stop ring and catch the strength member. Further the claw can be set a slit in the center to catch the strength member.

Hereinunder, embodiments will be explained with reference to the drawings.

Embodiment 1

Figure 1:
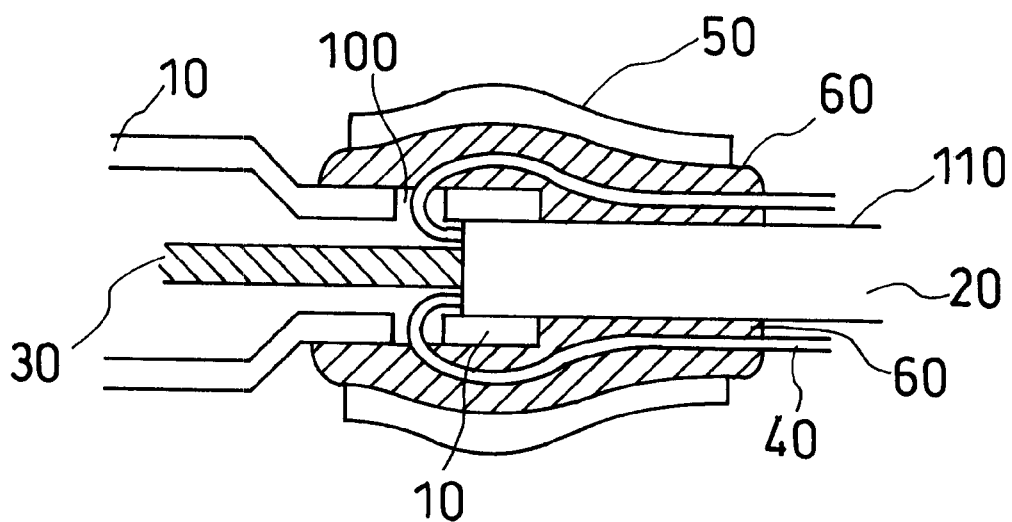
FIG. 1 is a sectional view of an optical connector of the present invention.

In an embodiment shown in FIG. 1, a through-hole 100 is provided at an end of a stop ring 10 on a side of fixing a cable 20 of an optical connector. A strength member 40 is passed through this through-hole 100, and further the strength member 40 is arranged by being bent to a direction of an outer jacket 110 on an outer side of the stop ring 10. And, a heat-shrinkable tube 50 with a hot melt type adhesive 60 is arranged on an outer sheath a surface of the cable 20 from an outer peripheral surface of the stop ring 10 on a cable 20 fixing side.

According to the present embodiment, the adhesive 60 can fix the strength member 40 passing through the through-hole 100. A joining strength for the stop ring 10 and cable 20 was obtained nearly to a tensile strength of the strength member 40 and a material strength of the through-hole 100. Furthermore, a high air-tightness was obtained by the shrinkage of the heat-shrinkable tube 50 and the adhesive 60 acting also as a sealant between the heat-shrinkable tube 50 and the outer jacket 110. Extremely high waterproof was confirmed.

Example 2

Figure 2:
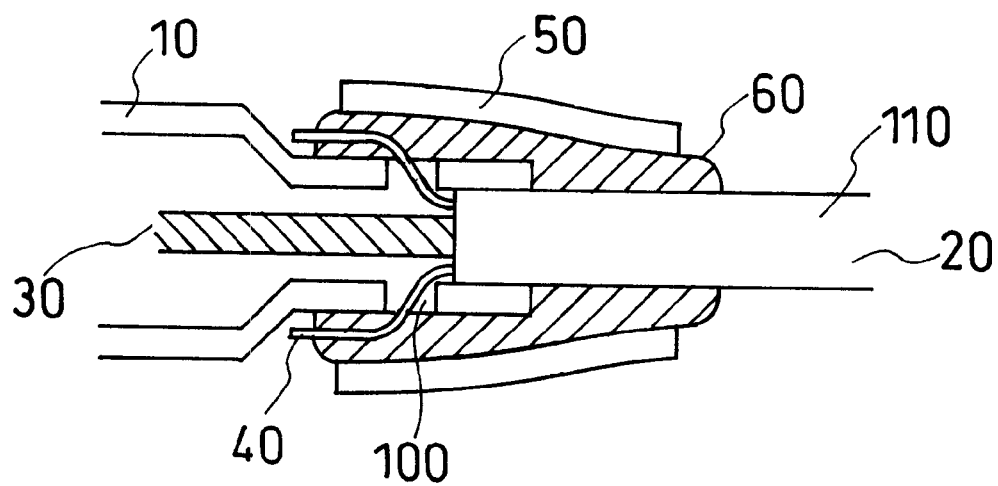
FIG. 2 is a sectional view showing another embodiment of an optical connector of the present invention.
Figure 3:
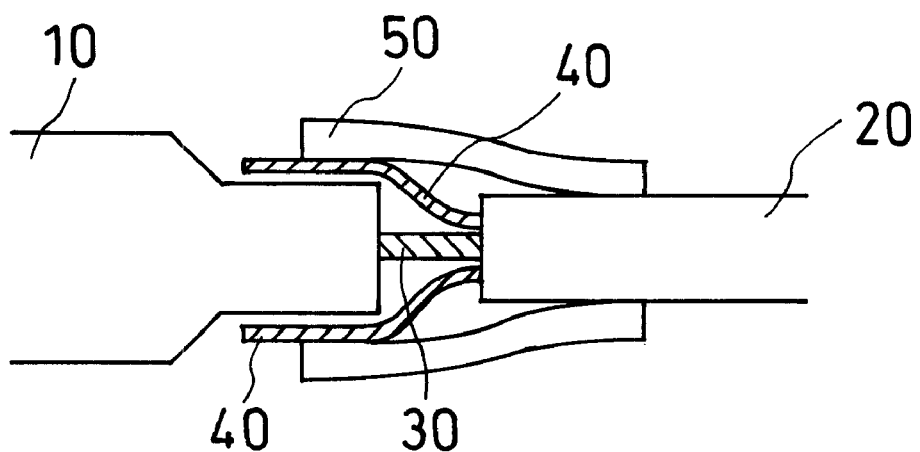
FIG. 3 is a sectional view of a conventional optical connector.

As another embodiment, in FIG. 2 the strength member 40 is drawn out in a direction to the stop ring 10 without being bent to the optical cord side. The strength member 40 and optical cord outer jacket 110 at their surfaces are compressed and fixed by the heat-shrinkable tube 50 with adhesive 60.

According to the present embodiment, bending-back operation of the strength member 40 becomes unnecessary, and the operation of covering the heat-shrinkable tube 50 over the stop ring 10 becomes easy.

Embodiment 3

Figure 4:
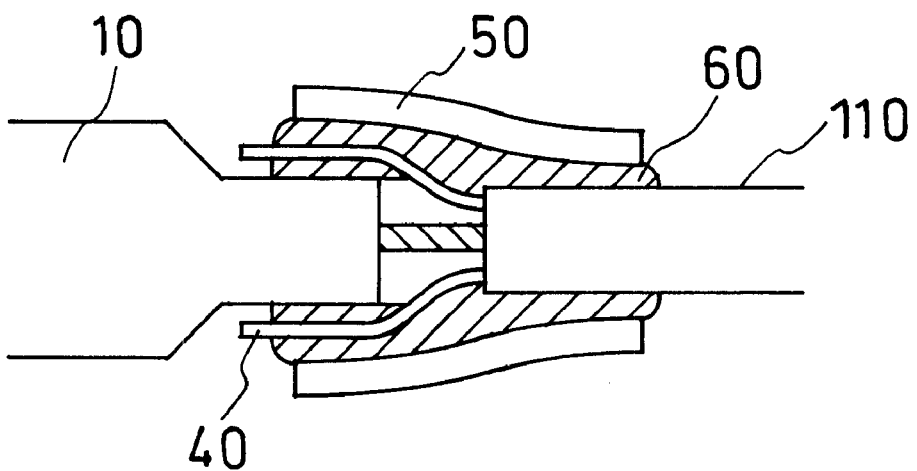
FIG. 4 is a sectional view showing another embodiment of the present invention.

FIG. 4 is arranged by further simplifying the scheme of Embodiment 2, wherein the heat-shrinkable tube 50 with adhesive 60 is directly covered over an outer periphery of the stop ring 10 and the outer jacket 110 and heated thus conducting fixing due to thermal shrinkage and adhesive.

According to the present embodiment, the stop ring 10 can be used in the conventional form. Because of having no through-hole, an advantage is provided that the stop ring 10 is free from lowering in strength. Furthermore, because the conventional caulking process is not required, the stress applied to the stop ring 10 in assembling or use is small. Due to this, even if the stop ring 10 is reduced in wall thickness, required tensile strength could be satisfied.

Embodiment 4

As another embodiment, In FIG. 5 is shown a structure improved in the stop ring 10 on its optical cord fixing side in order to introduce easily the strength member 40 into the through-hole 100. A cutout 150 for introducing the strength member 40 into the through-hole 100 was provided at an end of the stop ring 10. A groove 180 with a gap of 0.1 mm was provided at an apex of the cutout 150 axially of the stop ring 10. At an opposite end of the groove 180 to the cutout 150, a convex portion 160 is provided. The direction of an apex of the convex portion 160 is directed toward a radial direction of a surface of the stop ring 10. Here, a slit 170 was provided axially of the stop ring 10 which is to expand an inner diameter of the stop ring during optical cord insertion in an opposite direction of the groove 180 of the convex portion 160.

A through-hole 100 for fixing the strength member 40 guided by the convex portion 160 was provided at lower portion of the groove 180. A claw 200 was formed which has a constant width between the through-hole 100 and the cutout 150 to compress and fix the strength member 40. In the present embodiment, the groove 180 had a length of 1.6 mm. The through-hole 110 had a width of 1.0 mm.

In FIG. 6 was shown a side view that the above stop ring 10 is fixed with a cable 20. The strength member 40 coming from an end of the outer sheath 20 is fixed at a lower portion of the through-hole 100 and compressed by the claw 200, thus being prevented against removal.

According to the present embodiment, because a guiding cutout 150, groove 180 and convex portion 160, it is easy to introduce the strength member 40 into the through-hole 100. Furthermore, by inclining the claw 200 toward an inner diameter side of the stop ring 10, the outer jacket 110 can be compressed and fixed. Thus, an optical connector was obtained which is easy to assemble and high in tensile strength.

Embodiment 5

Although the through-hole 100 shown in FIG. 5 and FIG. 6 if one in number functions, an example provided with a plurality of through-holes 100 is shown in FIG. 7. FIG. 7 is an A–B sectional view of FIG. 5, wherein the FIG. 5 through-hole 100 was symmetrically provided at two locations about as a symmetry axis an axis of the stop ring 10. Because the symmetrical two through-holes 100 are provided with an arrangement such that the claws 200 of FIG. 5 are in reverse direction to each other, the cable 20 in the stop ring 100 is free of axial deviation and an overall tensile strength becomes high. Furthermore, by rotating the cable 20 after inserting the strength member 40 into the groove 180, the strength member 40 could be inserted and fixed in two through-holes 100 at the same time.

By symmetrically providing at least two through-holes 100 symmetrically about the axis of the stop ring 10 in this manner, the eccentricity of optical cord can be reduced. Furthermore, by providing three or more through-holes, the eccentricity was further reduced.

Embodiment 6

Figure 8A:
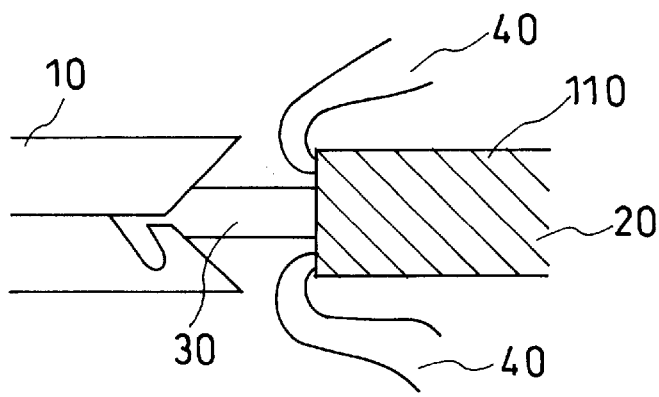
FIGS. 8A–8C are views showing a fabrication process for an optical connector of the present invention.

FIG. 8 is a figure showing a process for inserting a cable 20 in a stop ring 10 to perform compression and fixing by a heat-shrinkable tube 50. The heat-shrinkable tube 50 is previously arranged on a periphery of the stop ring 10 or on the periphery of the cable 20. Then, an outer jacket 110 of the cable 20 is partly removed and a core wire 30 is inserted in an inner periphery of the stop ring 10. At this time, the strength member 40 is directed toward the outer jacket 110 on an opposite side to the stop ring 10 (FIG. 8A).

Figure 8B:
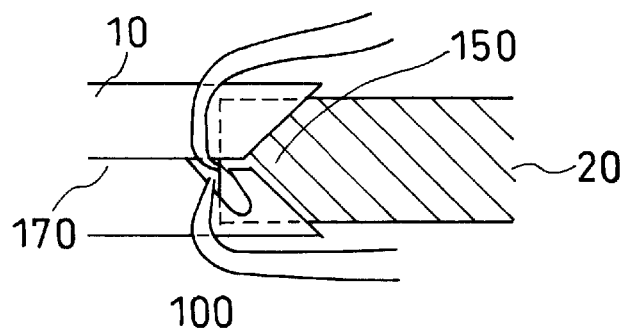

Next, the cable 20 is inserted in the stop ring 10 and the strength member 40 is introduced in the through-hole 100 while guiding by a cutout 150 (FIG. 8B).

Figure 8C:
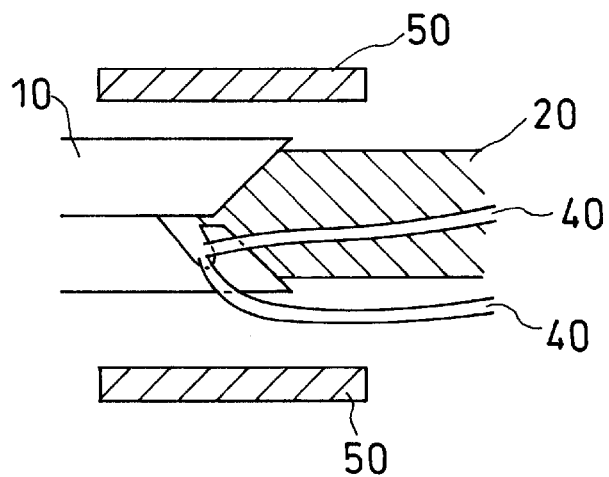

Then, the strength member 40 is moved to a lower portion of the figure thereby being fixed in the through-hole 100. Finally, the heat-shrinkable tube 50 is placed around the through-hole 100 from a stop ring 10 side or cable 20 side (FIG. 8C).

Furthermore, the heat-shrinkable tube 50 is heated to fix the stop ring 10 and the cable 20.

According to the assembling method of the present invention, an optical connector high in tensile strength was obtained which is easy to position the optical cord 10 in position and handle the strength member 40.

Embodiment 7

Figure 9:
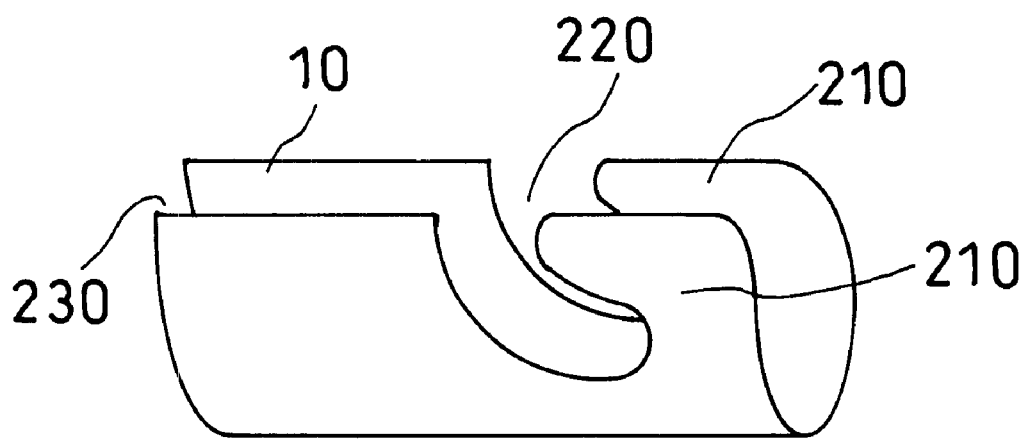
FIG. 9 is a view showing another embodiment of a stop ring of the present invention.

FIG. 9 is a figure showing an end of the stop ring 10 for fixing a cable 20, of the present invention. A concave portion 220 is formed at an end of a slit 230 providing two engaging pieces 210 in the end of the stop ring 10.

According to the present embodiment, the strength member although not shown can be fixed by merely being inserted from one direction of from above to below of the concave portion 220, thus facilitating attaching an optical cord. Furthermore, if fixing including the outer sheath by the heat-shrinkable tube, more firm optical cord fixing becomes possible.

Embodiment 8

Figure 10:
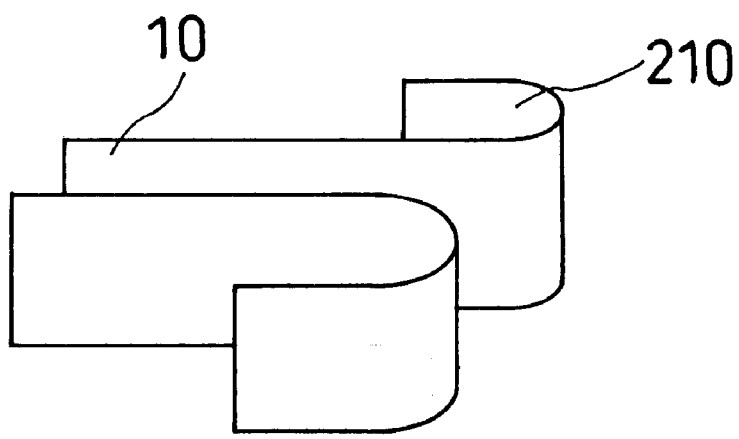
FIG. 10 is a view showing another embodiment of a stop ring of the present invention.

FIG. 10 is a figure showing an end of the stop ring 10 of the present invention, wherein an engaging pieces 210 are made in a structure bent back to outer sides of the stop ring 10. In the embodiment, the engaging piece 210 is easy to fabricate. The state of introducing the strength member can be visually observed. By using also fixing with the heat-shrinkable tube, a sufficient tensile strength could be obtained.

Embodiment 9

Figure 11:
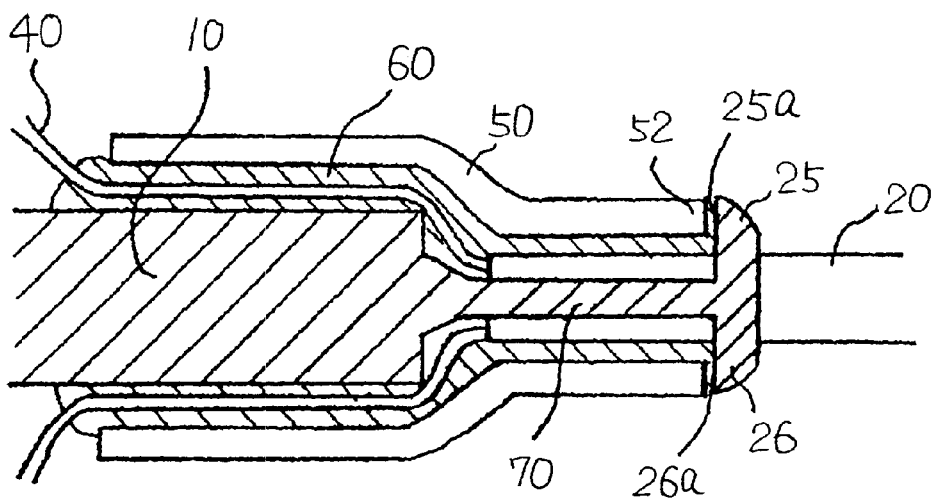
FIG. 11 is a sectional view of an optical connector of the present invention.
Figure 12:
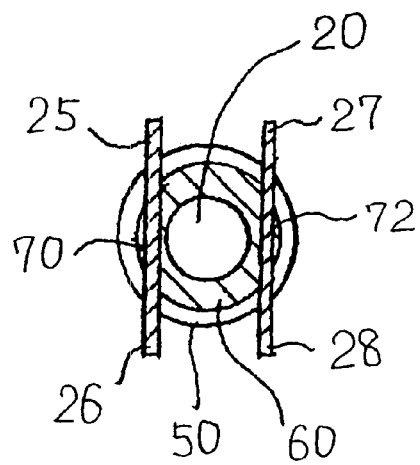
FIG. 12 is a sectional view of an optical connector of the present invention.

In an experiment shown in FIG. 11, at an end of the stop ring 10 on a side of fixing a cable 20 of an optical connector, the claws 25 and 26 are arranged upper and lower portion against the stop ring axis direction which is parallel to the radius direction, and restrict the portion of heat-shrinkable tube axis direction. The end portion 52 is arranged nearly touch the side of the claws 25a and 26a. Then claws 25 and 26 are extended toward the stop ring by joint 70. Further the strength member 40, which is in a cable 10, is extended over the end of the heat-shrinkable tube 50 and arranged between the inner surface of the end of the tube 50 and the stop ring 10. Also set the hot melt type adhesive 60 to surround the periphery of the strength member 40. FIG. 12 is a side view of the optical connector, wherein a first claws 25 and 26 and a second claws 27 and 28 are arranged to sandwich the outer jacket of the cable 20 then restrict the position of the end of heat-shrinkable tube.

In the present embodiment, the heat-shrinkable tube having a hot melt type adhesive 60 is arranged outer peripheral direction of the stop ring 10 and heating so that the heat-shrinkable tube is shrinkage and stick to the stop ring 10. Simultaneously cure the adhesive 60 and adhere with sandwich the strength member 40. According to the present embodiment in FIG. 11, in case the cable 20 is pulled to the right direction. If the heat-shrinkable tube 50, which is fixed by the adhesive 60, move to the right direction, the end portion 52 of the heat-shrinkable tube 50 hit on the side face 25a and 26a of the ring 20. Then the cable 20 can not move over the position so that the tensile strength is increased.

Embodiment 10

Figure 13:
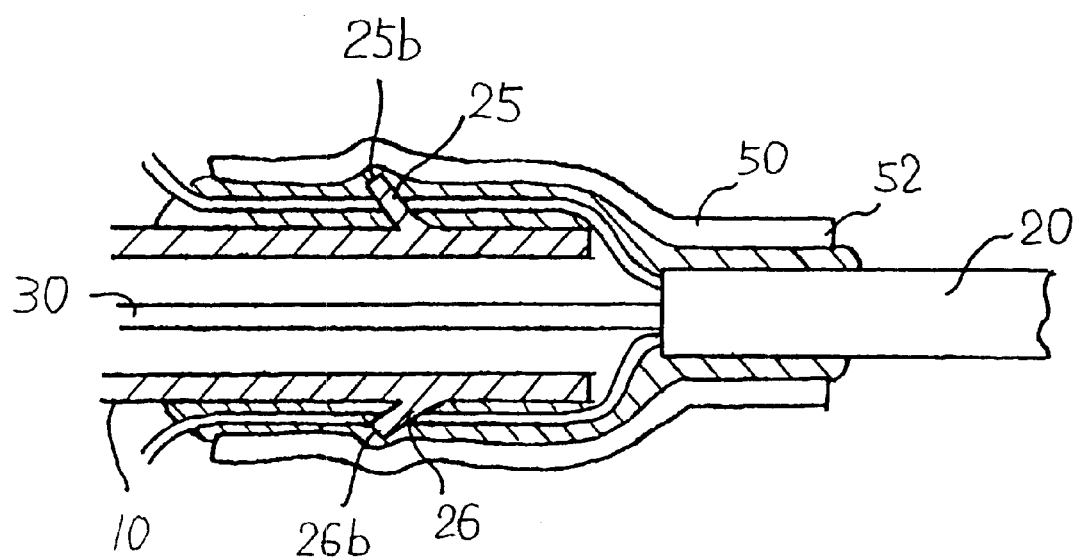
FIG. 13 is a sectional view of an optical connector of the present invention.

In FIG. 13, claws 25 and 26, which extended by joint 70, are arranged at the rear portion of the stop ring 10. Then the cable side end portion 52 of heat-shrinkable tube 50 is adhered by adhesive 60 in the outer jacket of the cable 20. In addition, buffer coating 30 is connected to the inner surface of the stop ring 10.

At this point, the open direction of the claws 25 and 26 against the radius direction of the stop ring 10 is the front of stop ring 10, that is ferrule side. Then the points 25b and 26b of the claws 25 and 26 stick in the inner surface of the heat-shrinkable tube 50 so that the tensile strength is increased.

Embodiment 11

Figure 14:
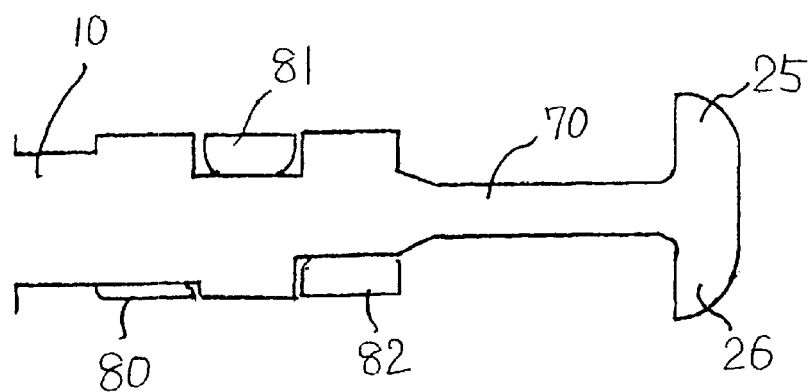
FIG. 14 is a front view of a stop ring of the preset invention.
Figure 15:
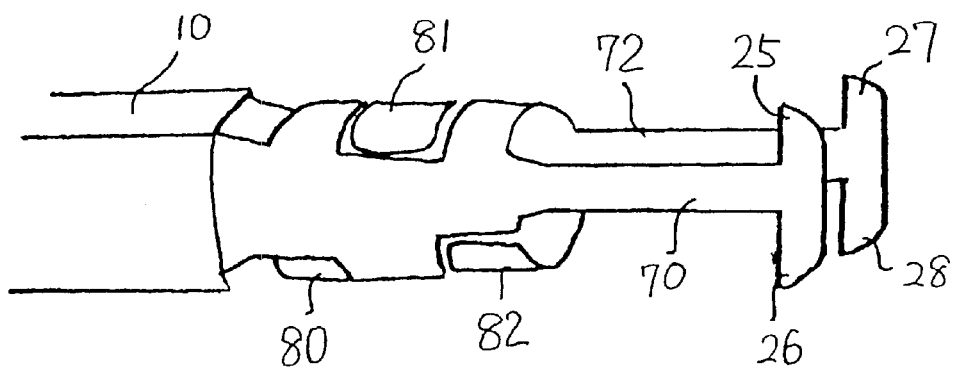
FIG. 15 is a perspective view of a stop ring of the present invention.

As another embodiment, in FIG. 14 is shown a rear of the stop ring 10, wherein lips 80, 81 and 82 are provided at the right angle to the axis direction of the surface of the stop ring 10. FIG. 15 is a perspective view of the stop ring of FIG. 14. One claws 25 and 26 side has a lip 81 the other claws 27 and 28 side has another lips 80 and 82 in front and rear of the lip 81. Further the lip 81 has narrow gaps in the axis direction of the stop ring 10 in contrast has wide gap in the radius direction.

Embodiment 12

Figure 16:
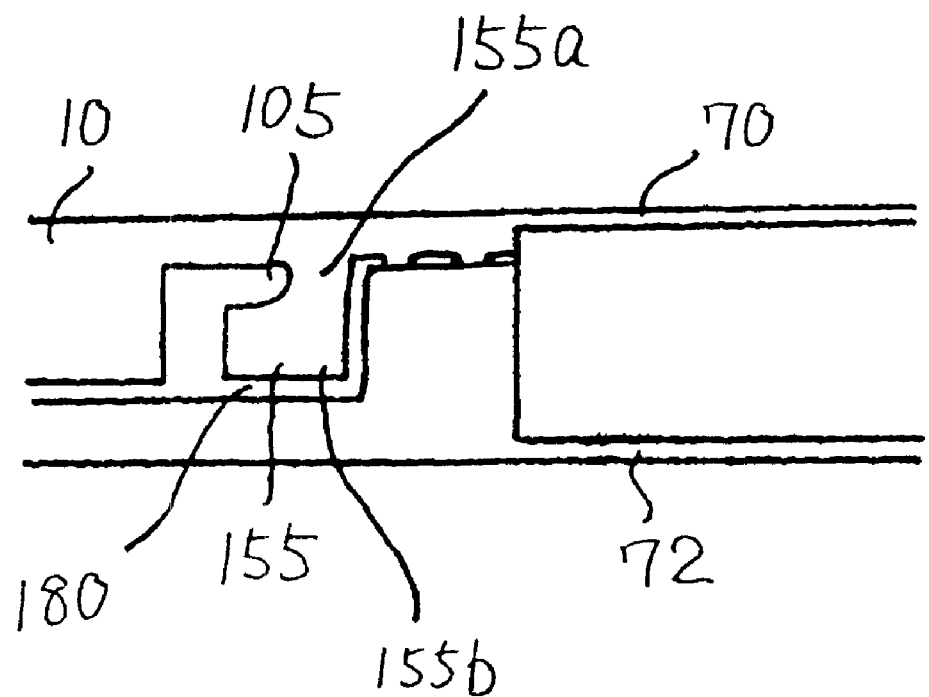
FIG. 16 is a front vies of a stop ring of the present invention.

As another embodiment, in FIG. 16 is shown a top view of the rear of the stop ring. The stop ring has right side joint 70 and left side joint 72. In addition, the base of the right side joint 70 is provided a concave 105 to obtain a tensile strength by crimp the strength member and groove 180 on the concave 105 to high tensile strength.

Further the claw 155 having the concave 105 on the base 155a rise over the paper surface that is protrude in the radius direction. Then the tensile strength of the concave becomes higher because the tip 155b sticks the inner surface of the heat-shrinkable tube.

Embodiment 13

Figure 17B:
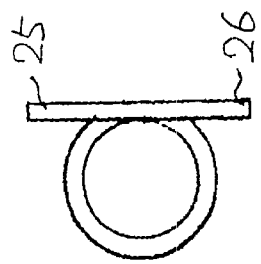
FIGS. 17A–17C are plane views of a stop ring of the present invention.
Figure 17A:
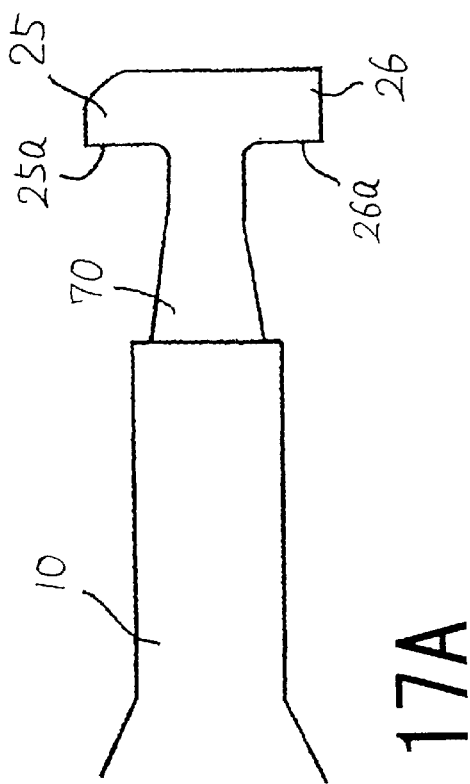
Figure 17C:
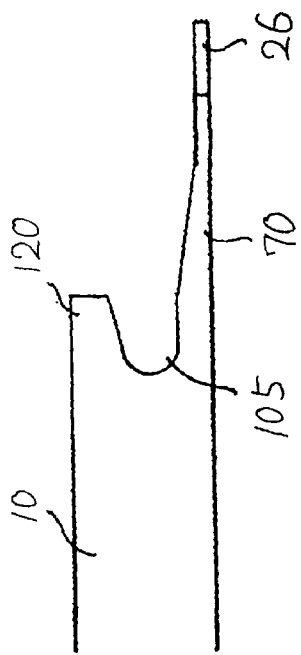

FIGS. 17 show stop ring 10 having a joint 70 and claw 25 and 26 only one side thereof. FIG. 17A is a top view, FIG. 17B is a side view and FIG. 17C is a front view of the present embodiment. The side faces 25a and 26a of the claws 25 and 26 prevent the heat-shrinkable tube from sliding the position.

In FIGS. 17A–17C, during set up the optical connector, the strength member insert in to the concave 105, shrinkage the shrinkable tube on the surface of the extending portion 120 and joint 70, and adhere and fixing the stop ring.

Embodiment 14

Figure 18B:
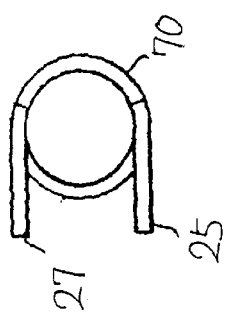
FIGS. 18A–18C are plane views of a stop ring of the present invention.
Figure 18A:
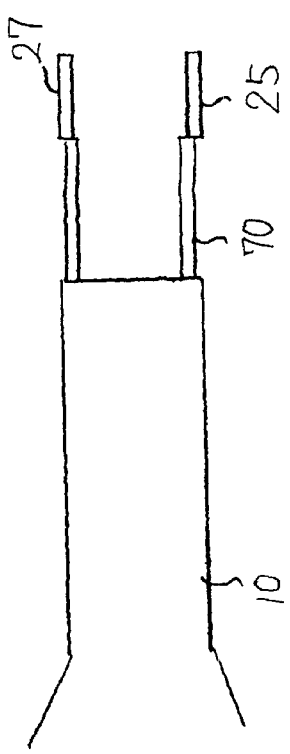
Figure 18C:
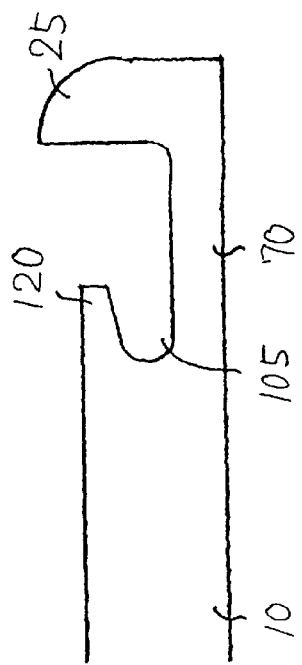

FIGS. 18A–18C show the claws 25 and 27 arranged parallel to the axis direction of the stop ring 10. The joint 70 is common against each claw and the joint 70 has wide width and curved surface so that the connector has a high tensile strength. FIG. 18A is a top view, FIG. 18D is a side view and FIG. 18C is a front view of the embodiment. In FIG. 18C both protrude 120 and joint 70, which faced the protrude 120 are curved surface, and on a concentric circles so that the sectional shape is circle. Then the strength member can be arranged in front of the stop ring. As a consequent, the heat shrinkable tube is fixed certainly.

Embodiment 15

Figure 19:
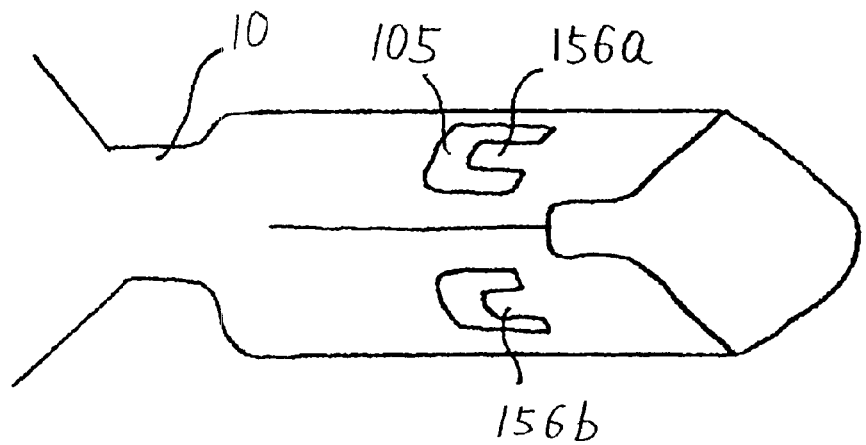
FIG. 19 is a front view of a stop ring of the present invention.
Figure 20:
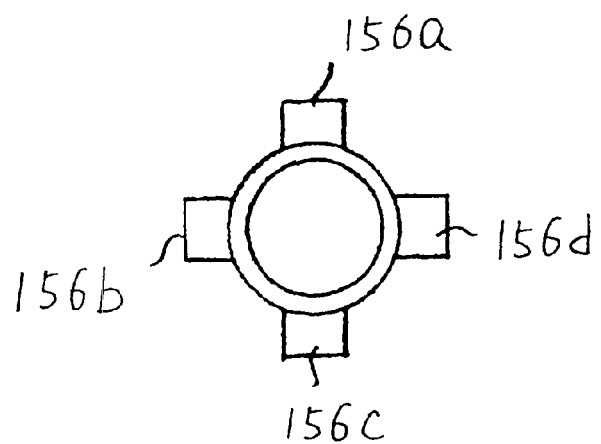
FIG. 20 is a side view of a stop ring of the present invention.

FIG. 19 shows claws 156a and 156b arranged in the axis direction of the stop ring 10. Then the tips of the claws 156a and 156b are more outside against the stop ring 10 compared to the plane of the concave 105. FIG. 20 is a side view of FIG. 19, wherein the four claws 156a, 156b, 156c and 156d are arranged in 90 degree against the stop ring axis. Then when the heat shrinkable tube is shrinkage, force to the four claws are balanced each other so that the heat shrinkable tube does not biased and optical connector with low connecting loss can be obtained.

Embodiment 16

Figure 21B:
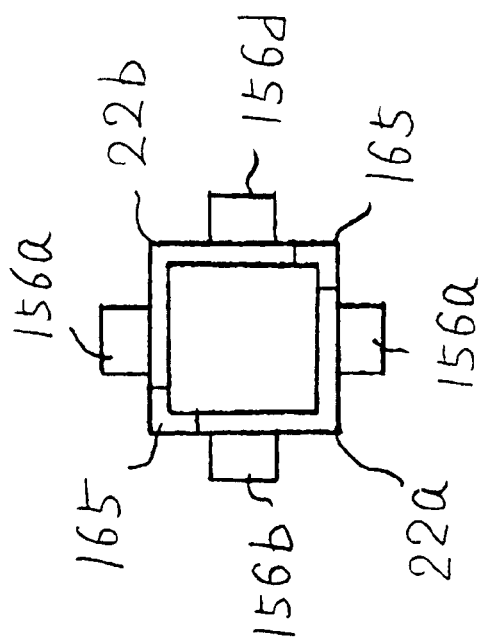
FIGS. 21 are plane views of a stop ring of the present invention.
Figure 21A:
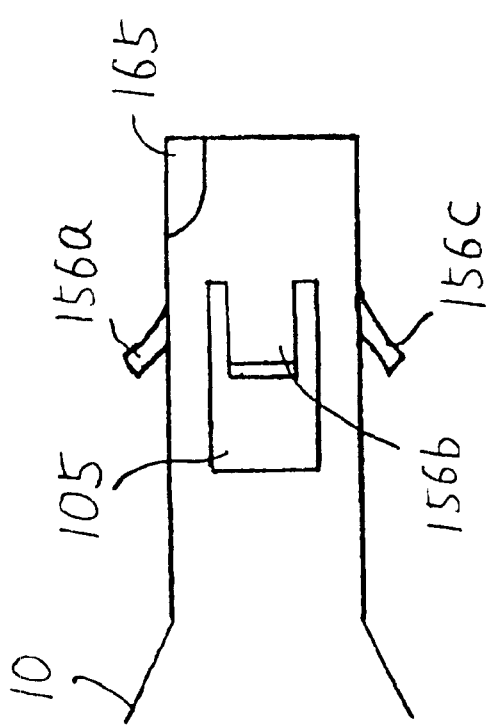

FIGS. 21A–21B show an embodiment, wherein the section corresponding to FIG. 19 and FIG. 20 is square and FIG. 21A is a from view and FIG. 21B is a side view. In FIG. 21A, the base of claws 156a, 156b and 156c are on a plane each other and the tips are curved toward the outer periphery of the stop ring 10. Each claws are inside of the concave 105. In addition, the rear corner of the stop ring has the concave 105 and the strength member can be arranged from the concave 165 to the outer portion of the stop ring 10 then the adhesive of the inner surface of the heat shrinkable tube flows in the stop ring and fix the coated fiber and prevent the optical fiber in the connector from stopping the movement. In FIG. 21B, each claws 156a, 156b, 156c and 156d are arranged in parallel in each other and the claws 156b and 156c are formed on the side face 22a, which bend a plate, and the claws 156a and 156d are on the side face 22b.

Embodiment 17

FIG. 22 shows an embodiment to improve the bonding strength by sandwich the strength member 40 by the claw 156. In this embodiment, the stop ring has, lower member having the claw 156 and upper member having a concave 105 corresponds to the claw 156. The claw 156 faces at right angle to the stop ring 10 axis and the tip is curved slightly to the outer periphery of the stop ring. The strength member 40 is sandwiched and hold by the claw 156 so that the cable is rigidly fixed by summation of three forces which include compression of the shrinkage of the heat shrinkable tube and bon ding force of hot melt type adhesive on the inner surface of the heat shrinkable tube. The coated fiber 30 prevent the adhesive 60 from sticking by the strength member 40 and relax the movement in axis direction of the coated fiber 12 during connecting the optical connector.

Embodiment 18

FIG. 23 shows an optical connector wherein a strength member is sandwiched by a slit of claw in axis direction thereof. Then the strength member can be set in the slit with ease because the stop ring has a V shaped groove on the tip of the slit 170.

The present invention is practiced in the form as explained above and has the effect as described below.

The stop ring and the optical cord can be fixed by the heat-shrinkable tube having an adhesive in an inner surface result in an improvement in workability without requiring caulking tool. Thus, an optical connector can be made which is high in tensile strength and waterproof.

Further, because the fixing can be made by heating, the stop ring and the optical connector can be fixed simultaneously with bonding the ferrule and fiber core.

What is claimed is:

1. An optical fiber connector comprising: a stop ring having an end portion having an outer periphery; an optical fiber cable having a strength member extending from an end thereof; an adhesive material disposed over the end portions of the stop ring and the optical fiber cable so that at least a portion of the strength member of the optical fiber cable is embedded in the adhesive material; and a heat-shrinkable tube having an inner surface and disposed on the adhesive material so that the portion of the strength member is disposed between the inner surface of the heat-shrinkable tube and the outer periphery of the stop ring.

2. An optical fiber connector according to claim 1; wherein the adhesive material is disposed on the inner surface of the heat-shrinkable tube.

3. An optical fiber connector according to claim 1; wherein the strength member extends through a through-hole at the end portion of the stop ring and is folded over an outer jacket of the optical fiber cable.

4. An optical fiber connector according to claim 1; wherein the strength member extends through a through-hole at the end portion of the stop ring and is folded over an outer jacket of the optical fiber cable; and wherein the stop ring has a cut-out disposed at the end portion thereof for introducing the strength member into the through-hole.

5. An optical fiber connector according to claim 1; wherein the stop ring has at least one claw portion projecting in a radial direction thereof.

6. An optical fiber connector according to claim 5; wherein the claw portion is disposed on an end of the stop ring opposite to the end portion having the outer periphery.

7. An optical fiber connector according to claim 6; wherein the at least one claw portion comprises a pair of claw portions disposed parallel to an axis of the stop ring.

8. An optical fiber connector according to claim 7; wherein the pair of claw portions is symmetrical about the axis of the stop ring.

9. An optical fiber connector according to claim 5; wherein the at least one claw portion comprises a pair of claw portions extending in a radial direction of the stop ring.

10. An optical fiber connector according to claim 5; wherein the claw portion is connected to a body of the stop ring through an intermediate joint.

11. An optical fiber connector according to claim 5; wherein the claw portion has a pointed end penetrating the strength member and disposed parallel to a radial direction of the stop ring.

12. An optical fiber connector according to claim 5; wherein the claw portion has a central slit through which the strength member extends.

* * * * *